Nov. 14, 1961  J. SCHNEIDER  3,008,267
MECHANICAL TOY
Filed Feb. 25, 1960  2 Sheets-Sheet 1
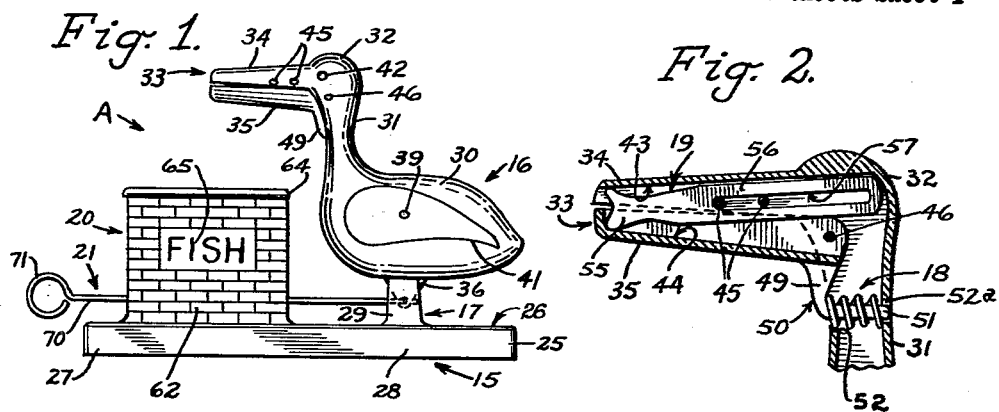
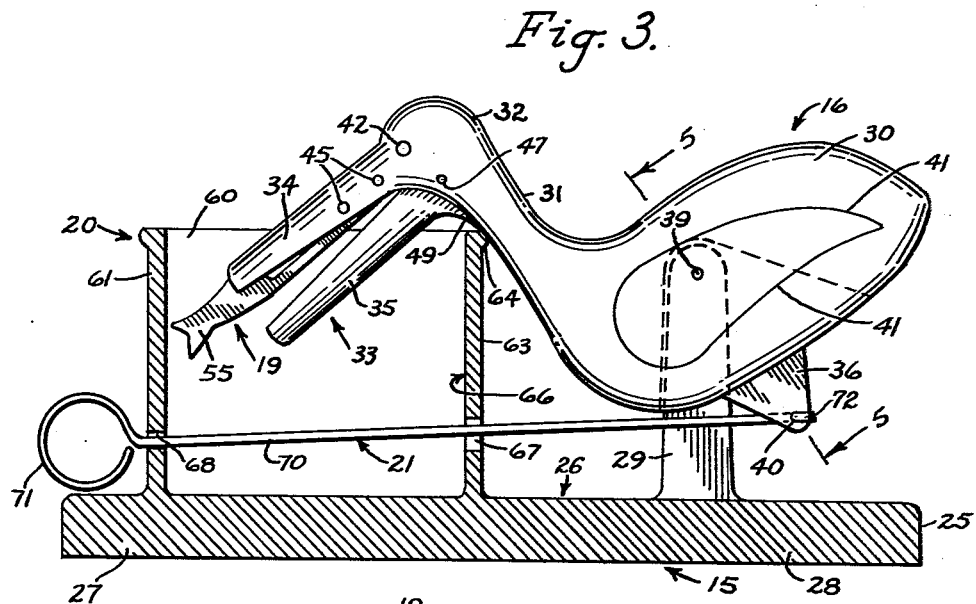
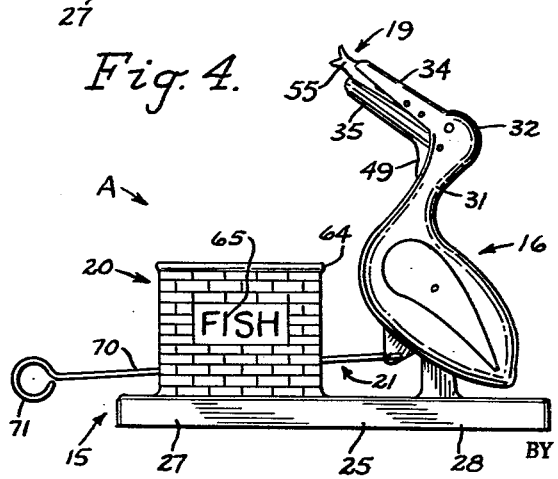
INVENTOR
JOHN SCHNEIDER
BY
ATTORNEYS Nov. 14, 1961  J. SCHNEIDER  3,008,267
MECHANICAL TOY Filed Feb. 25, 1960  2 Sheets-Sheet 2

INVENTOR
JOHN SCHNEIDER

BY

ATTORNEYS

United States Patent Office 3,008,267
Patented Nov. 14, 1961

3,008,267
MECHANICAL TOY
John Schneider, 713 Miller Ave., Ann Arbor, Mich.
Filed Feb. 25, 1960, Ser. No. 11,047
6 Claims. (Cl. 46—124)

This invention relates to toys and more particularly to mechanical toys simulating live animals or other animate objects.

An important object of the invention is to provide a toy, as described above, in which a bird simulation, for example, is caused to first dip or oscillate forwardly and, when the beak is well within a receptacle, the rear portion of the under chop of the bill will contact a portion of the edge of the receptacle and cause the beak to open and, for example, a reciprocable fish simulation of some weight, concealed within the closed beak, will slide forwardly and be retained in a position wherein it is partly outwardly of the forward ends of the chops so that, as the simulation then dips or oscillates backwardly, the beak will be raised to an upwardly-inclined position and the weight of the fish simulation will cause the fish simulation to slide into the beak, the lower chop of which will then close and remain closed until the beak is again within the receptacle, thus providing an interesting and amusing simulation of, for a closer example, a pelican taking fish, one after another, from a container, as a basket, and swallowing them.

Another important object of the invention is to provide a simulation as described above in which there is required only a pivoted lower chop, in conjunction with an edge of a container in order to effect opening of the beak, and closing of the beak is effected by a conventional expansion coil spring which is concealed.

Other objects and advantages of the invention will be apparent during the course of the following detailed description of the invention taken in connection with the accompanying drawings, forming portions of this disclosure, and in which drawings:

FIGURE 1 is a side elevational view of one form of the invention, with the bird simulation having its beak closed.

FIGURE 2 is a fragmentary vertical sectional view of the head portion of the invention as in FIGURE 1 but on an enlarged scale.

FIGURE 3 is a side elevational view of the form of invention of FIGURE 1 but on an enlarged scale and with the bird simulation tipped forward and its beak open.

FIGURE 4 is a side elevational view of the showing in FIGURE 1 but with the bird simulation tipped backwardly.

Figure 8:
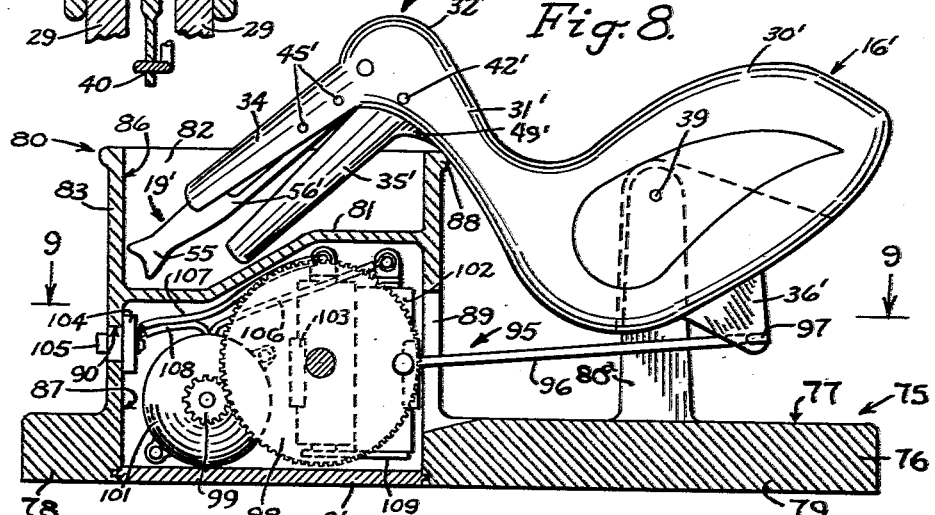
FIGURE 8 is a view, partly in side elevation and partly in vertical section of a modification of the invention.
Figure 9:
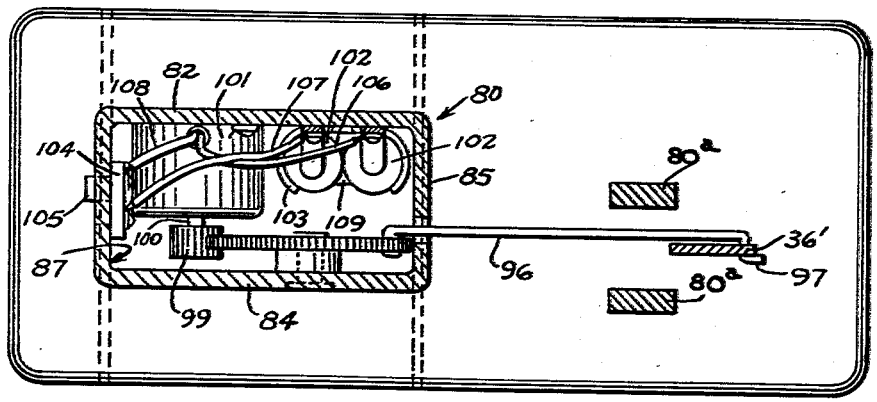
FIGURE 9 is a view, mostly in horizontal section, of the form of the invention of FIGURE 8.

In the drawings, wherein for the purpose of illustration is shown two embodiments of the invention and wherein similar reference characters designate corresponding parts throughout the several views, the letter A designates the form of the invention shown especially in FIGURES 1 to 4 inclusive and B, the form of the invention of FIGURES 8 and 9.

The forms A and B are preferably alike, except for the different operating means and differences in structure of the container or housing for portions of the operating means.

Referring mainly to FIGURES 1 to 5, the form A comprises a support structure 15; a movable simulation of an animate object, as an animal simulation 16; means 17 mounting the same upon the support structure 15; means 18 carried by the animal simulation for moving a movable portion of the animal simulation in one direction; an object simulation 19 as a modified fish simulation, reciprocable in and partly outwardly of the chops of the animal simulation; an inanimate object, as a container 20 upon the support structure; and means 21 for operating, as oscillating, the animal simulation, which means is supported by the container 20.

The support structure 15 may be a horizontally-disposed platform or body 25, with upper face 26, a forward end portion 27 and a rearward end portion 28. The body 25 may be, for example, of metal, wood, hardened plastic material or combinations thereof. Extending upwardly from the body 25 at the rearward end portion 28 is a bifurcated post 29 for a purpose later detailed.

As a desirable animal simulation 16, I prefer to employ that of a bird and, more specifically, a pelican. A pelican has a bad reputation among fisherman as a caught-fish stealer. The simulation includes a body portion 30, neck portion 31, head portion 32, with bill or beak 33 with a fixed upper chop 34 and movable lower or under chop 35. At least the head and neck portions and the chops are hollow, such as may be seen in FIGURE 2. The body portion 30 may also be hollow, as shown by way of example in FIGURE 5, and includes a downwardly-projecting arm 36, extending from substantially the longitudinal and transverse central area of the body. It will be noted that I prefer to provide, as in FIGURE 5, axially-aligned pivot pin-accommodating openings 37 and 38 in the body portion and the edges of the free end part of the arm 36 preferably define a V, and this free end part is provided, adjacent the apex of the V, with a small opening 40 to accommodate the hooked end portion of a reciprocating member forming part of the means 21. The body portion 30 is mounted for oscillation or rocking upon the post 29 by the means 17 comprising a pivot pin which extends through the openings 37, axially aligning openings 29a in the bifurcated post 29 and the opening 38 in the arm 36. The body, neck and head portions and bill may be of metal, hardened plastic material, wood or the like or combinations of these and the exterior of the body portion may be provided with lines 41 defining wings while the head portion may be provided with eye simulations 42.

With special reference to the bill or beak 33 and neck and head portions 31 and 32 respectively, the head portion 32 and upper chop 34 define a recess 43, while the under chop 35 defines a second recess 44 cooperating with the recess 43 to provide a recess for the object 19 and means for slidably retaining the object 19, and which preferably comprises two spaced-apart axially-aligned cylindrical pins 45 bridging the upper chop 34 intermediate its ends.

The lower or under chop 35 is of special construction. The rearward end portion is pivoted, as by the pivot pin 46 which is journalled in axially-aligned openings 47 at substantially the juncture of the head and neck portions at the forward parts thereof. The under chop 35 has a downward projection 49 at its rearward end, having a forward edge 50 and a portion of this projection 49 normally extends outwardly of the neck portion through an opening 52 in the latter but the projection may pivot inwardly well into the hollow of the neck portion and so cause the under chop 35 to pivot downwardly on the pivot pin 46, thus opening the bill, as may be seen in FIGURE 3. This projection 49 simulates the pouch or bag attached to the under chop of the pelican and in which it appears to deposit the fish simulation which it appears to swallow. At the lower end portion of the projection 49 is a rearwardly-extending plunger 51, the free end of which is contained in a small opening 52ᵃ in the neck portion 31.

Means 18 for moving the under chop 35 to move to a closed position after the fish simulation is wholly within the bill is provided by an expansion coil spring extending about the plunger 51, with one end convolution bearing against the inner surface of the back of the neck portion 31 and the other end convolution bearing against the inner face of the projection 49, substantially as shown in FIGURE 2. Further details regarding the projection 49 and means 18 will be found in connection with the description of the container 20.

Figure 5:
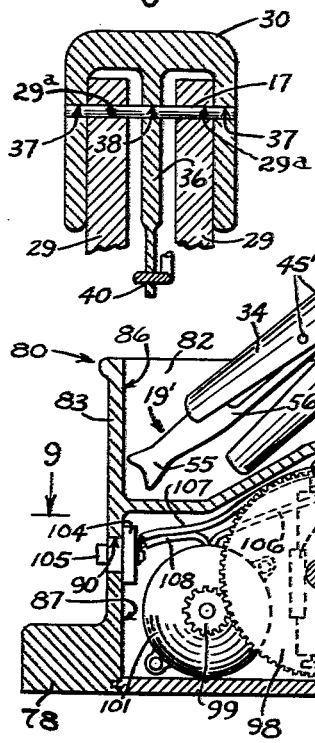
FIGURE 5 is a vertical transverse sectional view, along the line 5—5 of FIGURE 3.
Figure 6:
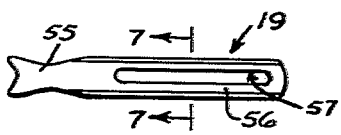
FIGURE 6 is a side elevational view of the fish simulation of FIGURES 2, 3 and 4.
Figure 7:
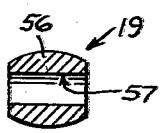
FIGURE 7 is a vertical transverse sectional view on an enlarged scale, on the line 7—7 of FIGURE 6.

The object 19 may be the simulation of an animate or inanimate object which the animal simulation appears to swallow. Preferably, it is a modified fish simulation, best shown in FIGURES 6 and 7, and includes a tail portion 55 and body portion 56 provided with a longitudinally extending slot 57 spaced relatively far from the tail portion. The spaced-apart pins 45 extend through the slot 57 and limit movement in both directions for reciprocation of the object 19 carried thereon so that, as in FIGURE 2, the object 19 is wholly within the closed bill but the end of the object opposite the tail portion 55 does not strike the back of the head portion 32. Or, as in FIGURE 3, the object is partly outwardly of the open bill, but prevented from dropping out of the open bill. The object 19 may be the simulation of an animate or inanimate object and is preferably of relatively heavy metal, so that it will tend to reciprocate, due to the pull of gravity and not be unduly retarded or stopped by friction.

Referring now to the preferably inanimate object simulation, which is shown as a container 20 which, in reality, functions as a container for portions of the operating means 21 and, in addition, provides a fixed firm abutment for contact by the projection 49, as well as provides a concealment for the greater portions of the chops and the object 19 when the bill opens, as in FIGURE 3. This container may be a wicker basket simulation for example, may be integral with the support structure 15 and project upwardly from the upper face 26 at the forward end 27 of the platform or body 25, having a plurality of walls, such as the walls 60, 61, 62 and 63, the later being the rearward wall and provided with an upper, preferably beaded edge 64 and the bead of which may extend about the upper edges of the other walls. I may provide appropriate indicia 65 upon a wall or upon more than one wall of the container, such as the word "Fish." The walls 60–63 and bottom of the container define a compartment or chamber 66. Preferably the container 20 has rigid walls so that, as the animal simulation tips forwardly, there will be firm contact of the bead 64 with the face 50 of the projection 49, causing the under chop 35 to pivot to an open position, allowing the object 19 to slide forwardly. Of course, when the animal simulation reaches the position shown in FIGURE 4 where the contact of the projection and bead no longer exists and gravity causes the object 19 to slide rearwardly, the spring of the means 18 will expand, causing the bill to close. In the wall 63 is preferably provided an opening, as a vertically-extending slot 67, and in the opposite wall 61, there is provided an opening 68 which may be a cylindrical perforation, both for accommodation of portions of the means 21 for operating the animal simulation.

The means 21 is shown in FIGURES 1, 2 and 4 as a rod 70 extending through the openings 67 and 68, through the chamber 66 and outwardly of the walls 61 and 63. At its outer end, the rod 70 may have a finger grip, as a ring 71 and at its inner end it is connected to the arm 36 by a hook 72 at this latter end extending into the opening 40. Thus, reciprocating of the rod 70 will oscillate the animal simulation 16 to take its various positions.

Referring now to the form B of the invention, the support structure 75 thereof has a substantially horizontal platform or body 76 with upper face 77, forward end portion 78, rearward end portion 79 and has an upwardly-extending bifurcated post 80ᵃ substantially like the post 29.

The animal simulation 16' is preferably exactly like the simulation 16 and reference numerals, followed by an exponent ('), is employed to designate parts of the simulation 16' corresponding to the simulation 16. Means preferably similar to the means 17 is employed for mounting the simulation 16' upon the support structure 75 and the means for moving a movable portion of the simulation 16' in one direction is similar to the means 18 while the object 19' is also preferably like the object 19.

The container 80 differs from the container 20 in that there is a partition 81 bridging the walls 82 to 85 so that there is an upper compartment 86 and a lower compartment 87, the former being open at its upper end and the upper edges of the walls is preferably provided with a bead 88 substantially like the bead 64 and functions in a similar manner in conjunction with the projection 49'. The wall 85 is provided with an opening, being a vertically-extending slot 89 opening to the compartment 87, and the wall 83 having an opening 90 also opening to the compartment 87 and both for portions of the means 95 provided for operating the animal simulation 16: I prefer to provide a movable closure 91 for the compartment 87. This may be a sliding panel with its two longitudinal edges sliding in slots.

In the form B, means 95 is given, by way of example, to take the place of means 21 of the form A, and includes the reciprocating rod 96 having a connection, as by a hook 97 with the arm 36' but the forward end of the rod, which extends through the slot 89, is pivotally connected to a relatively large-diametered speed reduction gear 98 which is geared with a small gear 99 fixed to the shaft 100 of a conventional electric motor (by way of example) 101. The gear 98 may have its spindle journalled in the wall 84 and the motor 101 may be mounted upon the wall 82. Electric power for the motor may be supplied by a storage battery or storage batteries, such as the dry cells 102 which are carried by clip means 103 supported by the wall 82 and electrically connected between the battery or batteries and the motor 100 with a conventional electric switch 104 carried by the wall 83 and interposed in an electric circuit, with the switch button 105 of the switch 103 extending through the wall 83 for "on" and "off" manipulation of the switch. The circuit is a conventional one and comprises the leads 106 and 107 from the terminals of opposite polarity of the two batteries 105 one extending to and electrically connected with the motor 101 and the other extending to and electrically connected with one terminal of the switch 104, while the lead 108 extends from the other terminal of the switch to electrical connection with the motor of course the other terminals of the batteries are electrically connected as is well known in the art, such as at 109.

In both forms of the invention, contact of the projection 49 or 49' with the bead 64 or 88, as the case may be, causes the chop 35 or 35', as the case may be, to pivot to an open position without any direct manual manipulation of the projection, the chop or the area or areas adjacent the projection, chop or bead. In the case of the two forms of the invention, shown by way of examples, manual manipulation is remote from the several projections 49 and 49', chops 35 and 35' and beads 64 and 88. In the case of form A, the operator grasps the ring 71 and reciprocates the rod 70 while, in the form B, he simply presses the switch button 105 in order to start reciprocation of the rod 96 and subsequently presses this switch button in order to stop reciprocation of the rod 96.

Various changes in the size, shape and arrangement of parts may be made to the forms of invention herein shown and described, without departing from the spirit of the invention or scope of the claims.

What is claimed is:

1. A mechanical toy including a support structure, an inanimate object simulation rigid with and extending from said support structure and having a fixed structure portion providing an abutment; an animate object simulation provided with a body portion having an outwardly projecting fixed upper portion and an outwardly projecting movable hollow lower portion of rigid material provided with a downwardly extending projection; means pivoting said lower portion adjacent the inner end portion thereof to said body portion to pivot in a path away from said fixed upper portion; pivoting means mounting said animate object simulation upon said support structure to pivot in a path toward and away from said fixed structure portion with said fixed support portion interposed in the path of travel of said projection to contact and move said projection when said animate object simulation pivots towards said inanimate object simulation, whereby contact of said projection with said fixed structure portion will cause said movable lower portion to pivot in a different path from that of the first mentioned path; means for pivoting said animate object simulation upon said support structure; and a weighted reciprocable object slidably carried partly within said movable portion to move in one direction when said projection contacts and is moved by said fixed portion.

2. A mechanical toy according to claim 1 characterized in that said inanimate object simulation has a plurality of spaced-apart upstanding walls and an upwardly-opening compartment between said walls, one of said walls provides said fixed structure portion at the upper end thereof; said outwardly projecting fixed upper portion is hollow, with the hollow portions being normally in side-by-side contact, one with the other, to define a recess; said weighted reciprocable object is normally carried within said recess and means is provided to slidably support said weighted reciprocable object by said hollow fixed portion selectively wholly within or partly out of said recess; said compartment being disposed in the path of travel of said hollow portions upon pivoting of said animate object simulation in one direction; said movement of said movable hollow lower portion in a different path taking place while said hollow portions are partly within said compartment and their free ends are lowermost.

3. A mechanical toy according to claim 1 characterized in that said inanimate object simulation has a plurality of spaced-apart upstanding walls and an upwardly-opening compartment between said walls one of said walls provides said fixed portion at the upper end thereof; said movable hollow portion has a plunger extending from said projection, below the pivotal connection of said movable hollow portion and said body portion, with an expansion coil spring, normally under tension, mounted upon and extending around said plunger, one end convolution of said coil spring bearing against said projection and the other end convolution of said coil spring bearing against a part of said body portion, the hollow portions being normally in side-by-side contact, one with the other, to define a recess; said weighted reciprocable object is normally carried within said recess and means is provided to slidably support said weighted reciprocable object by said hollow fixed portion selectively wholly within or partly out of said recess; said compartment being disposed in the path of travel of said hollow portions upon pivoting of said animate object simulation in one direction; said movement of said movable hollow portion in a different path taking place while said hollow portions are partly within said compartment and their free ends are lowermost.

4. A mechanical toy according to claim 3 characterized in that body portion is hollow and is provided with a slot in a wall thereof from the exterior of the body portion to the interior thereof; said rigid projection normally extends partly into said slot and partly outwardly thereof; and said plunger extends into the hollow of said body portion.

5. A mechanical toy according to claim 3 characterized in that said hollow fixed portion has an open forward end disposed in the reciprocatory path of said weighted reciprocable object, whereby said weighted reciprocable object may reciprocate through said open forward end when said hollow movable portion has pivoted along said different path, said hollow movable portion has an upwardly extending lip providing a closed forward end, and the forward end of said weighed reciprocable object engages said closed forward end when said hollow portions are in side-by-side contact, and said forward end moves out of the path of movement of said weighted reciprocable object when said hollow movable portion is urged to an open position by contact of said rigid projection with said fixed structural portion of said wall.

6. A mechanical toy according to claim 3 characterized in that said means for pivoting said animate object simulation includes a reciprocable member secured to said animate object simulation and extending into said inanimate object simulation.

References Cited in the file of this patent

UNITED STATES PATENTS 1,477,412        Adams _____ Dec. 11, 1923